(12) United States Patent
Taniguchi et al.

(10) Patent No.: US 7,571,964 B2
(45) Date of Patent: Aug. 11, 2009

(54) ELECTRIC TELESCOPIC APPARATUS FOR VEHICLE SEAT

(75) Inventors: Hiromi Taniguchi, Kariya (JP); Takuya Mizuno, Nagoya (JP); Masaki Okada, Yokkaichi (JP); Yukifumi Yamada, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 166 days.

(21) Appl. No.: 11/594,941

(22) Filed: Nov. 9, 2006

(65) Prior Publication Data

US 2007/0102985 A1  May 10, 2007

(30) Foreign Application Priority Data

Nov. 10, 2005  (JP) .............................. 2005-326126

(51) Int. Cl.
  *B60N 2/62* (2006.01)
  *A47C 7/50* (2006.01)
  *A47C 20/16* (2006.01)

(52) U.S. Cl. .............................. 297/423.36; 297/284.11

(58) Field of Classification Search ............ 297/284.11, 297/423.2, 423.22, 423.23, 423.36, 423.24, 297/423.26, 423.34
See application file for complete search history.

(56) References Cited

U.S. PATENT DOCUMENTS

| | | | | |
|---|---|---|---|---|
| 715,667 A * | 12/1902 | Kenny | .................... | 297/423.24 |
| 2,533,595 A * | 12/1950 | Luketa | ........................ | 297/330 |
| 3,794,381 A * | 2/1974 | Caldemeyer | ........... | 297/423.22 |
| 3,934,928 A * | 1/1976 | Johnson | ........................ | 297/71 |
| 4,715,654 A * | 12/1987 | Laskowitz | .................. | 297/329 |
| 6,095,610 A * | 8/2000 | Okajima et al. | ........ | 297/423.36 |
| 6,585,279 B1 * | 7/2003 | Galloway et al. | ........ | 280/304.1 |
| 7,229,134 B2 * | 6/2007 | Ito | ........................ | 297/423.26 |
| 2005/0184575 A1 * | 8/2005 | Baumann | ............... | 297/423.19 |
| 2006/0186721 A1 | 8/2006 | Flory et al. | | |
| 2008/0143137 A1 * | 6/2008 | Bowen | ........................ | 296/75 |

FOREIGN PATENT DOCUMENTS

WO  03/074318 A1  9/2003

OTHER PUBLICATIONS

Dennis P. Townsend, Dudley's Gear Handbook, 1991, McGraw-Hill Inc., Second Edition, pp. 3.8, 3.9, 4.18.*

* cited by examiner

*Primary Examiner*—David Dunn
*Assistant Examiner*—Tania Abraham
(74) *Attorney, Agent, or Firm*—Buchanan Ingersoll & Rooney PC (57) ABSTRACT

An electric telescopic apparatus for a vehicle seat includes a base body provided at one of the vehicle seat or an ottoman, a movable body provided at a movable portion, the movable body assembled to the base body so as to extend or retract relative to the base body, a rack fixed on one of a top surface or a bottom surface of the base body or the movable body, the rack being formed in a plate shape which extends in the extending and retracting direction of the movable body and having teeth, a pinion housed in the other of the base body or the movable body and engaged with the rack, a drive unit for driving the pinion, and a guide mechanism provided at the base body and the movable body to guide the movable body in the extending and retracting direction of the movable body.

16 Claims, 7 Drawing Sheets

ELECTRIC TELESCOPIC APPARATUS FOR VEHICLE SEAT

CROSS REFERENCE TO RELATED APPLICATIONS

This application is based on and claims priority under 35 U.S.C. §119 with respect to Japanese Patent Application No. 2005-326126 filed on Nov. 10, 2005, the entire content of which is incorporated herein by reference.

FIELD OF THE INVENTION

The present invention relates to an electric telescopic apparatus for a vehicle seat.

BACKGROUND

A known electric telescopic apparatus for a vehicle seat, described in WO03/074318, includes a telescopic component having three telescopic elements (32, 33, 34), which adjust the electric telescopic apparatus to be telescopic using an electric spindle drive, which is capable of adjusting a length of a leg rest (3). According to the known apparatus, an automatic telescopic type drive is positioned in the center of the telescopic element (33) and includes an electric motor (35) permanently connected to the telescopic element (33). The top telescopic element (32) is driven by a first spindle drive (36) and the bottom telescopic element (34) is driven by a second spindle drive (37). When the electric motor (35) is activated to rotate in one direction, the top telescopic element (32) and the bottom telescopic element (34) move away from the center of the telescopic element (33). When the electric motor (35) is activated to rotate in the opposite direction, the top telescopic element (32) and the bottom telescopic element (34) are moved towards the center of the telescopic element (33). A first spindle nut (41) of the first spindle drive (36) is geared with a second spindle nut (42) of the second spindle drive (37) so as to rotate in the opposite directions from another. Thus, the electric motor (35) drives the first spindle drive (36) in the opposite direction from the second spindle drive (37) by driving the first spindle nut (41) of the first spindle drive (37).

With the construction of the electric telescopic apparatus for the vehicle seat described in WO03/074318, a support structure for rotatably supporting the first and second spindle drives (36, 37) is required, and a support structure for supporting the first and second spindle nuts (41, 42) which drive the first and second spindle drives (36, 37) by drive force of the electric motor (35) is also required. Because those support structures are thick in height, there is a drawback that a thickness of the electric telescopic apparatus per se cannot be reduced even if a motor is downsized. Further, because the first and second spindle drives (36, 37) are bar shaped, space for accommodating the bars are also required.

In addition, because the first spindle drive (36) has a cantilever structure where one end of the first spindle drive (36) is fixed to a frame and the other end is unattached, the strength is insufficient. Although countermeasures for reinforcement such as providing a construction that supports the first spindle drive at both ends may be devised in order to overcome this problem, this might bring other drawbacks that weight of the apparatus is increased leading to further structure complications.

A need thus exists for an electric telescopic apparatus for a vehicle seat, which has higher strength capabilities with a simple and thin construction.

SUMMARY OF THE INVENTION

In light of the foregoing, the present invention provides an electric telescopic apparatus for a vehicle seat, which includes a base body provided at one of a seat portion of the vehicle seat or a base portion of an ottoman, a movable body provided at a movable portion, the movable body assembled to the base body so as to extend or retract forward and backward relative to the base body, a rack fixed horizontally in a tight contact manner on one of a top surface and a bottom surface of one of the base body or the movable body, the rack being formed in a plate shape which extends in the extending and retracting direction of the movable body, and having teeth at a longitudinal side portion thereof, a pinion housed in the other of the base body or the movable body and configured to be engaged with the rack, a drive unit having a drive source for driving the pinion, and a guide mechanism provided at the base body and the movable body to guide the movable body in the extending and retracting direction of the movable body.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawings as follows.

An electric telescopic apparatus for a vehicle seat applied to a vehicle seat having an ottoman according to a first embodiment of the present invention will be explained referring to FIGS. 1-5.

A vehicle seat 10 includes a seat for an occupant to sit on (i.e., serving as a seat portion) 11 fixed to a vehicle floor and a backrest (i.e., serving as a backrest portion) 12 which is orthogonally arranged on a rear end of the seat 11 so as to recline and fixed at a predetermined position at a predetermined reclining angle. An ottoman 13 (i.e., a footrest or a foot stool) which extends and retracts in the forward and backward direction and pivotally moves up and down relative to the front end of the seat 11 is disposed at a front end of the seat 11. The ottoman 13 is accommodated in a retracted state shown with a double-dashed chain line in FIG. 1 when not in use, and the ottoman 13 extends to stretch to a position shown with a solid line in FIG. 1 when in use.

Figure 1:
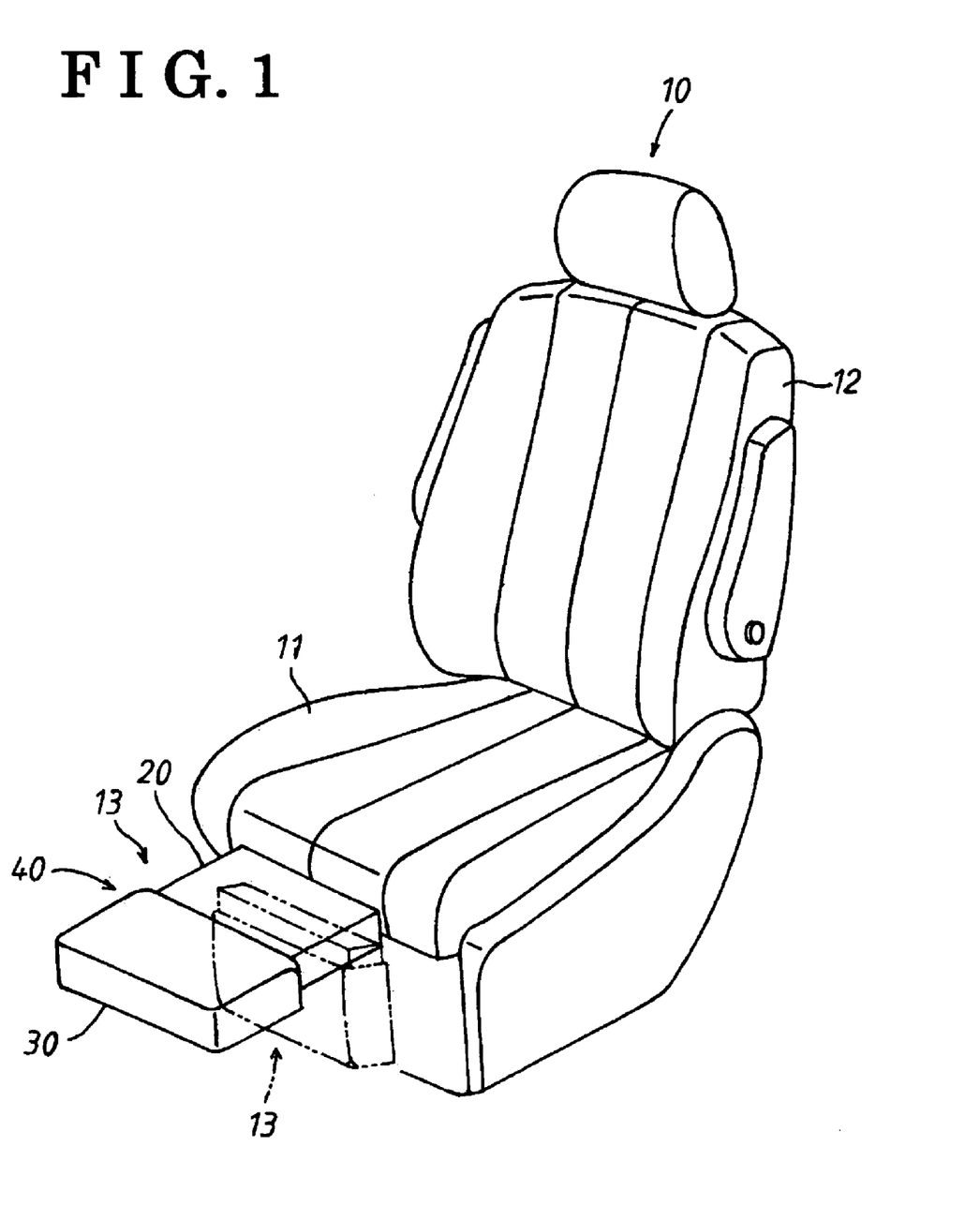
FIG. 1 is a perspective view showing an electric telescopic apparatus for a vehicle seat applied to a vehicle seat having an ottoman according to a first embodiment of the present invention.
Figure 2:
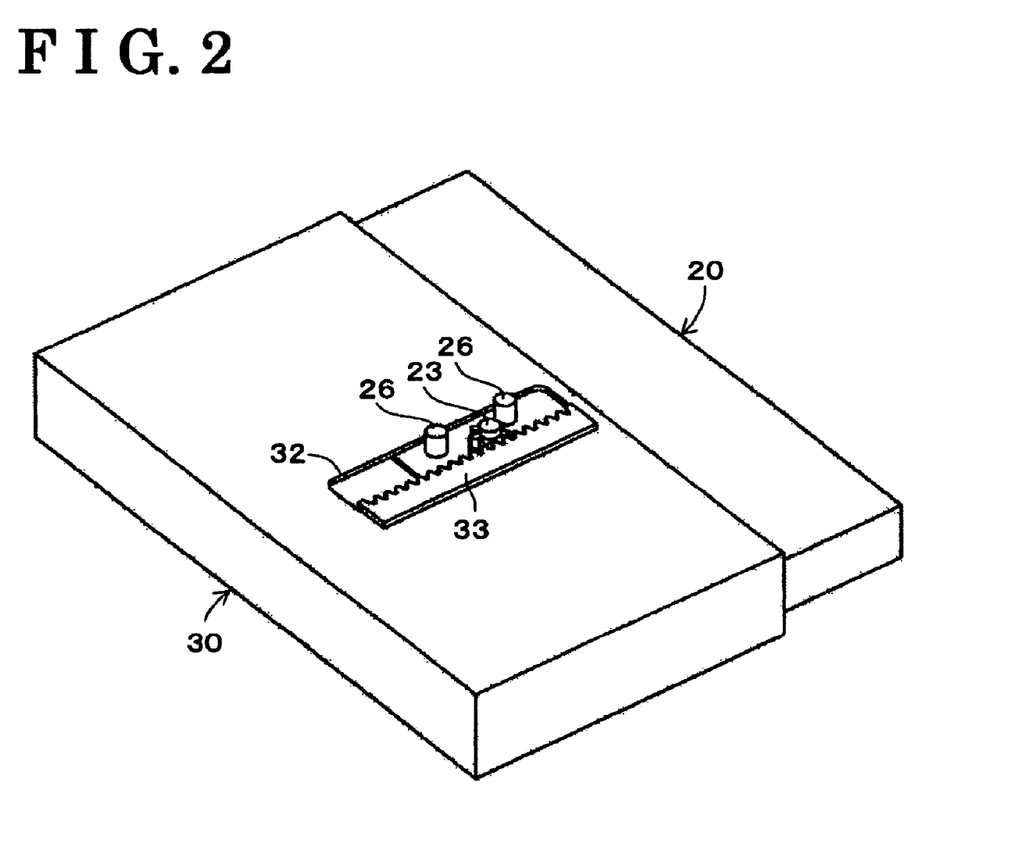
FIG. 2 is a perspective view showing the electric telescopic apparatus for the vehicle seat shown in FIG. 1 according to the first embodiment of the present invention.
Figure 3:
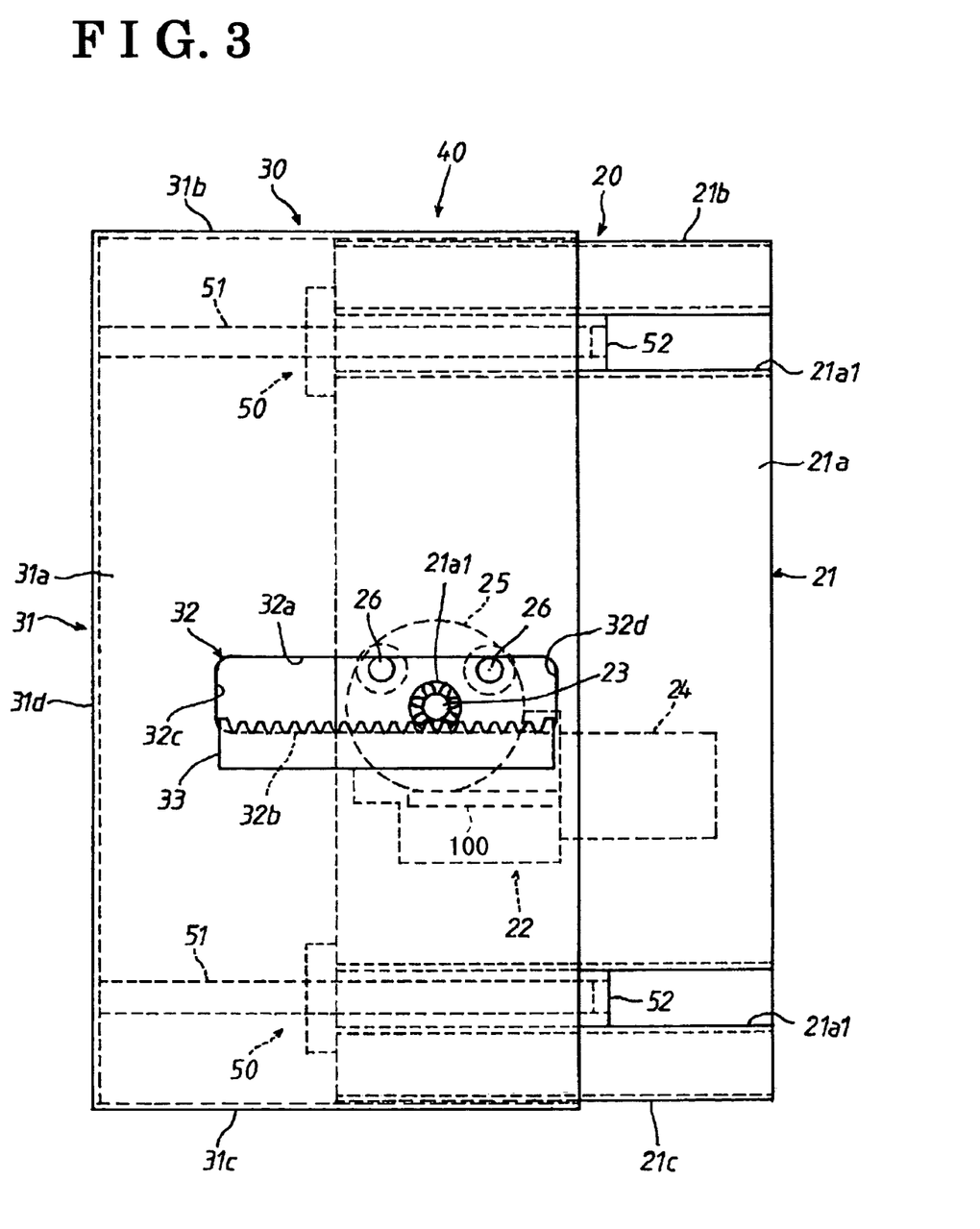
FIG. 3 is a plan view showing the electric telescopic apparatus for the vehicle seat shown in FIG. 1 according to the first embodiment of the present invention.
Figure 4:
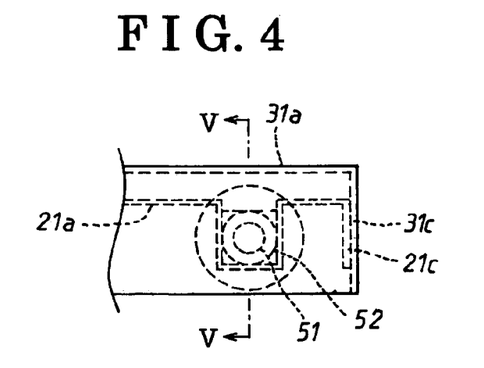
FIG. 4 is a partially enlarged front view showing the electric telescopic apparatus for the vehicle seat in FIG. 1 according to the first embodiment of the present invention.

The ottoman 13 includes an electric telescopic apparatus 40 having a base portion 20 and a movable portion 30. The base portion 20 includes a base body 21 which is covered with a cover member (e.g., a member made of resin). The base body 21 is formed to have an approximate U shape in a cross section that open in a downward direction. A rear end of the base body 21 is mounted on the front end of the seat by way of a pivotally moving mechanism. The mechanism pivotally moves the ottoman 13 to be fixed at a predetermined position and at a predetermined angle.

The base body 21 has a built-in drive unit 22. The drive unit 22 is mounted on a bottom surface of a top plate 21a of the base body 21. The drive unit 22 includes a pinion 23 which is engaged with a rack 33, an electric motor 24 which is a drive source for driving the pinion 23, and a speed reducer 25 which reduces a rotation speed of the electric motor 24 and transmits drive force to the pinion 23. The pinion 23 is provided projecting from a through hole 21a1 which is formed approximately in the center of the top plate 21a in a width direction. The electric motor 24 is cylindrically shaped, and is laid horizontally in order to save space. Drive sources other than the electric motor such as an ultrasonic motor may be applied instead of the electric motor. Because ultrasonic motors are generally configured in relatively flat cylindrical shapes and have a low height, the motor can be arranged vertically, which makes the thickness of the drive unit thinner compared to laying the cylindrical electric motor horizontally. The reducer 25 is a large diameter gear (i.e., serving as a gear) with which the pinion 23 is coaxially and integrally provided, and an external tooth of which is engaged with a worm gear 100 provided at an output shaft of the electric motor 24. The large diameter gear includes the number of tooth greater than that of the pinion 23, and the number of the tooth of the large diameter gear is predetermined to achieve a desired speed reduction ratio. The large diameter gear has a greater diameter than that of the pinion 23.

The movable portion 30 includes a movable body 31 which is covered with a cover (e.g., a skin member covering a foamed resin such as urethane). The movable body 31 is approximately box-shaped. The top plate 31a, side plates 31b, 31c, and a front plate 31d are connected to one another as a single unit. A rear portion of the movable body 31 is open (i.e., an opening), and the movable body 31 moves forward or backward (i.e., moves telescopically) relative to the base body 21 by extending from the base body 21 and by retracting to accommodate the base body 21 through the opening. The top plate 31a of the movable body 31 contacts a top surface of the top plate 21a of the base body 21 so as to slidably move thereon. The side plates 31b, 31c of the movable body 31 contact an external surface of side plates 21b, 21c of the base body 21 respectively so as to slidably move thereon.

A window 32 is formed approximately in a rectangular shape elongated in a moving direction of the movable portion 30 approximately in the center of the top plate 31a in a width direction. The window 32 includes sides 32a, 32b, 32c, 32d. The side 32a serves as a first guide portion. The sides 32a, 32b are arranged in parallel to the moving direction of the movable portion 30, the length of the sides 32a, 32b is identical to the length of a side portion of the rack 33, which is formed with tooth. Namely, the length of the sides 32a, 32b is determined to be identical to a movable length of the movable portion 30. The rack 33 is arranged in parallel to the side 32b within the window 32.

The rack 33 is formed in a plate shape extending in the moving direction of the movable portion 30 and is tightly in contact with and horizontally fixed to a top surface of the top plate 31a of the movable body 31. The rack 33 is fixed, for example by welding or by means of screws at plural positions to a surface. Plural teeth are formed so as to run the full length of the side portion in a longitudinal direction of the rack 33. The teeth formed on the rack 33 are configured to be engaged with the pinion 23 and are arranged facing an inside of the window 32.

The first guide portion which is formed in the vicinity of the rack 33 and in parallel to the rack 33 is provided at the top plate 31a of the movable body 31. According to the first embodiment of the present invention, the side 32a of the window 32 serves as the first guide portion. A pair of engaging pins 26, 26 serving as first engagement portions, which are guided by contacting (i.e., engaging with) the side 32a of the window 32, are provided at a top surface of the top plate 21a of the base body 21 so as to be convexly arranged through the window 32.

Figure 5:
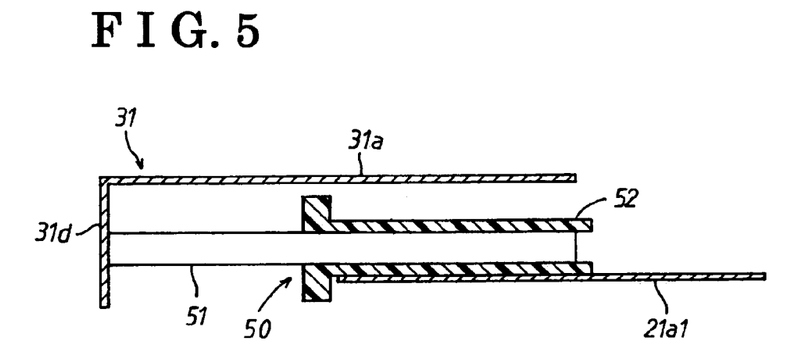
FIG. 5 is a cross-sectional view taken along line V-V in FIG. 4 according to the first embodiment of the present invention.
Figure 6:
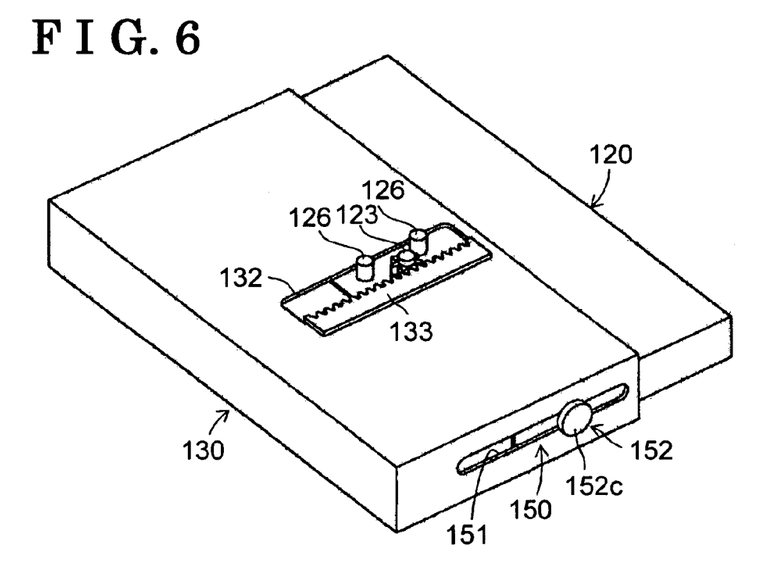
FIG. 6 is a perspective view showing an electric telescopic apparatus for a vehicle seat applied to a vehicle seat having an ottoman according to a second embodiment of the present invention.
Figure 7:
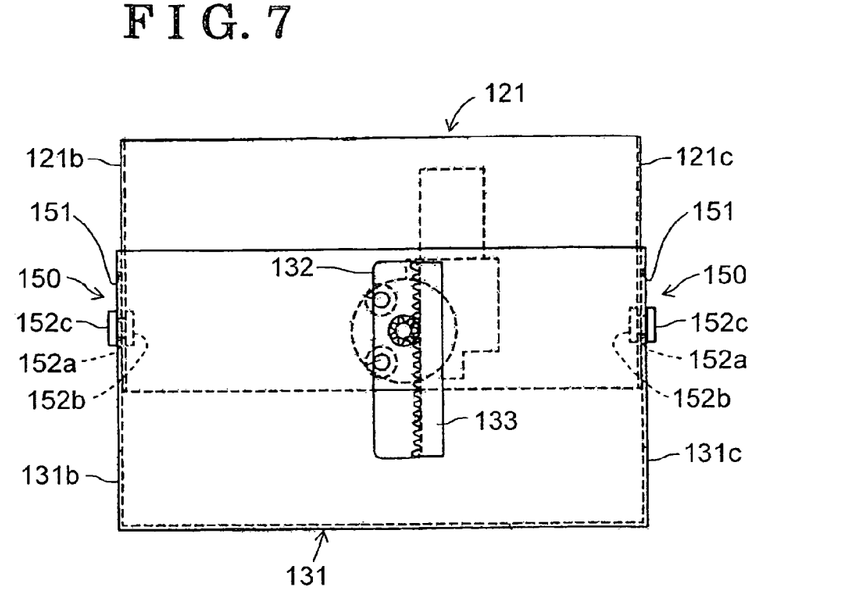
FIG. 7 is a plane view showing an electric telescopic apparatus for a vehicle seat of FIG. 6 according to the second embodiment of the present invention.

The electric telescopic apparatus 40 includes guide mechanisms 50, 50 which guide the movable body 31 (or the base body 21) along the moving direction thereof. The guide mechanism 50 includes a shaft 51 and a guide 52 outfitted onto the shaft 51 for the shaft 51 to move slidably. The shafts 51, 51 are provided at respective side portions on the right and left in the movable body 31, and are extended in the moving direction of the movable portion 30. A fixed end of the shafts 51, 51 is orthogonally fixed to an internal wall surface of the front plate 31d of the movable body 31. The guides 52, 52 are provided at side portions on the right and left respectively in the base body 21, and are extended in the moving direction of the movable portion 30. The guides 52, 52 are fitted into and secured to a pair of grooves 21a1, 21a1 respectively, which the grooves 21a1, 21a1 are formed at respective sides of the top plate 21a of the base 21 on the right and left in the moving direction of the movable portion 30. Although the guide mechanisms 50, 50 are provided at respective sides on the right and left, according to the embodiment of the present invention, the guide mechanism 50 may be provided at one of side portions on the right or left.

Figure 11:
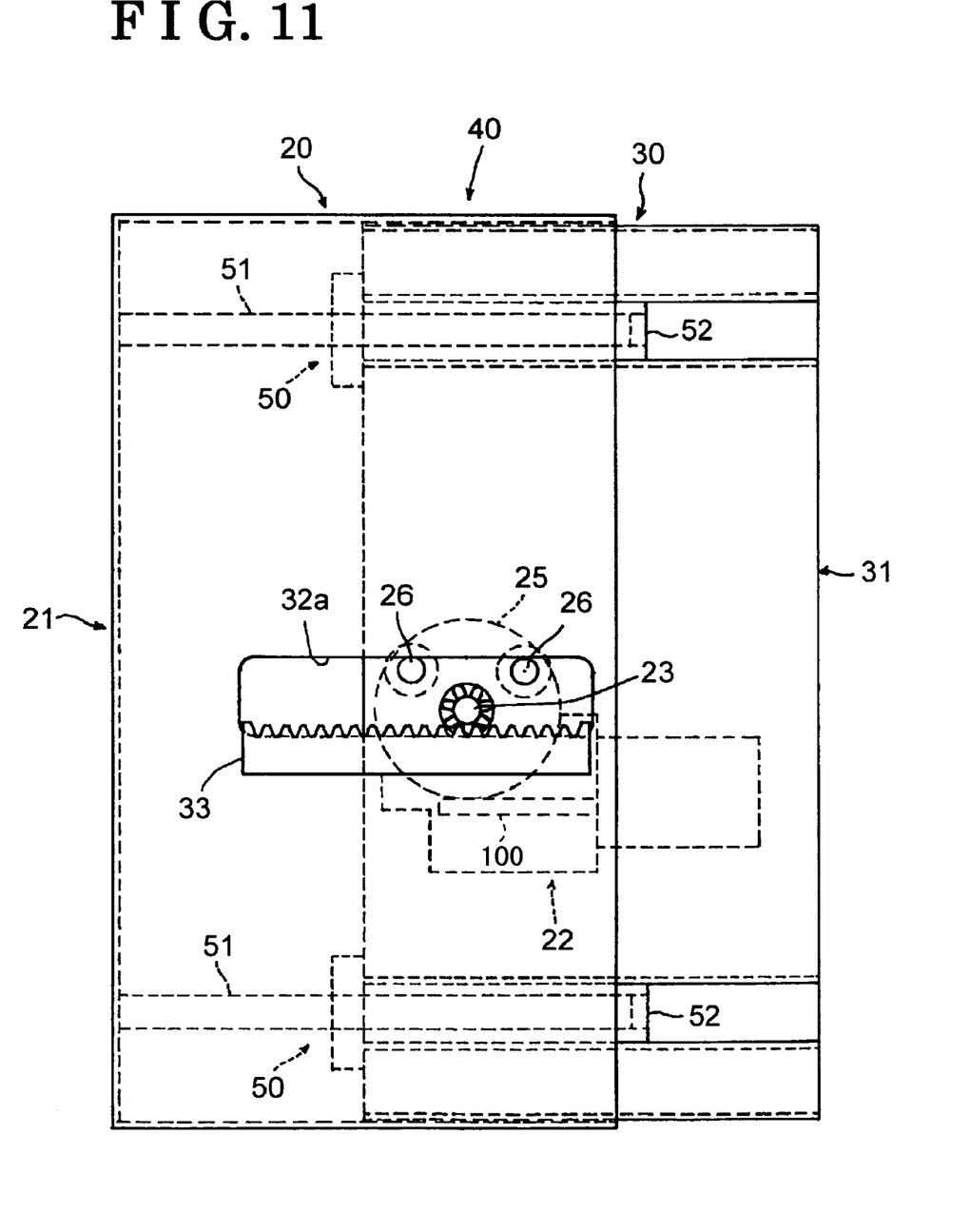
FIG. 11 is a plan view showing a variation of the electric telescopic apparatus for the vehicle seat according to the embodiments of the present invention.

Although the rack 33 is provided at the movable body 31 and the drive unit 22 including the pinion 23 is provided at the base body 21 according to the embodiment of the present invention, the rack 33 may be provided at the base body 21 and the drive unit 22 including the pinion 23 may be built in the movable body 31 as shown in FIG. 11.

As explained above, according to the first embodiment of the present invention, upon rotation of the pinion 23 driven by the electric motor 24 serving as a drive source built in the base body 21 (or the movable body 31), the rack 33, which is formed in a plate shape tightly in contact with the movable body 31 (or the base body 21) to be fixed horizontally and includes teeth provided at a side portion thereof in a longitudinal direction, is moved to slide, and thus the movable body 31 (or the base body 21) slides. Accordingly, space accommodating support structures which support known first and second spindle drives and first and second spindle nuts is not required, therefore thickness of an apparatus can be thinner with a simple construction. Further, because the rack 33 is tightly in contact with a top surface (or a bottom surface) of the top plate 31a to be fixed horizontally, the top surface which is a top surface of the movable body 31 (or the base body 21), a level of strength can be increased. The guide mechanism 50 securely guides the movable body 31 or the base body 21 in the moving direction.

The speed reducer 25 which reduces a rotation speed of the electric motor 24 is a gear with a large diameter, which is provided coaxially to and integrally with the pinion 23 and includes external teeth which are configured to be engaged with a gear mounted on an output shaft of the electric motor 24. Thus, the larger diameter gear is positioned horizontally on a top surface (or a bottom surface) of the top plate 31a corresponding to a top surface of the movable body 31 (or the base body 21). Thus, because a height of the speed reducer can be reduced, thickness of an apparatus per se can be lowered.

Further, because the rack 33 is arranged approximately in the center of the movable body 31 (or the base body 21) in a width direction, a wobbling movement (i.e., the moment) in a width direction when sliding is reduced to be less than a construction that the rack 33 is arranged at a side portion of the movable body 31. Accordingly, a structure of the guide mechanism 50 is simplified, and thus a structure of an apparatus can be simple.

Because the side 32a (i.e., serving as the first guide portion) on the left of the window 32, which the side 32a is formed opposing the rack 33 to be in parallel to one another in the vicinity of the rack 33 on the top surface (or bottom surface) of the movable body 31 and the pair of engagement pins 26, 26 serving as the first engagement portion which is provided on the top surface (or the bottom surface) of the base body 21 and is engaged with the first guide portion to be guided are further provided, when the movable body 31 starts to move, the engagement between the first guide portion and the first engagement portion restrains the wobbling movement in the width direction so that the movable body 31 starts sliding smoothly. Although the first guide portion is provided at the movable body 31 and the first engagement portion is provided at the base body 21 in the first embodiment, the first guide portion may be provided at the base body 21 and the first engagement portion may be provided at the movable body 31.

Because the guide mechanism 50 includes the shaft 51, which is provided at side portions on the right and left in the movable body 31 to be extended in the moving direction, and the guide 52, provided at side portions on the right and left in the base body 21 and outfitted onto the shaft 51 so as to slide therein, a guide mechanism is housed in the electric telescopic apparatus. This simplifies the construction of the cover members which cover the base body 21 and the movable body 31. Although the shafts 51, 51 are provided in the movable body 31 and the guides 52, 52 are provided in the base body 21 in the first embodiment, the shafts 51, 51 may be provided in the base body 21 and the guides 52, 52 may be provided in the movable body 31.

An electric telescopic apparatus for a vehicle seat applied to a vehicle seat having an ottoman according to a second embodiment of the present invention will be explained referring to FIGS. 6-9.

With the construction of the electric telescopic apparatus for the vehicle seat according to the first embodiment, the guide mechanism 50 includes shafts 51, 51 provided at sides in the movable body 31 on the right and left respectively and extended in a moving direction, and guides 52, 52 provided at the side portions in the base body 21 on the right and left respectively and outfitted onto the corresponding shafts 51, 51 respectively so as to slidably move relative to the shafts 51, 51. On the other hand, according to the second embodiment of the present invention, guide mechanisms 150, 150 are provided. Each of the guide mechanisms 150, 150 includes a second guide portion 151 provided at a side plate 131b which is a side on the left of a movable body 131 and a second guide portion 151 provided at a side plate 131c which is a side on the right of the movable body 131 respectively, both extended in an extending and retracting direction of the movable body 131, and a second engagement portion 152 provided at a side plate 121b which is a side on the left of a base body 121 and a second engagement portion 152 provided at a side plate 121c which is a side on the right of the base body 121 respectively, which are engaged with the respective second guide portions 151, 151 to be guided.

Figure 8:
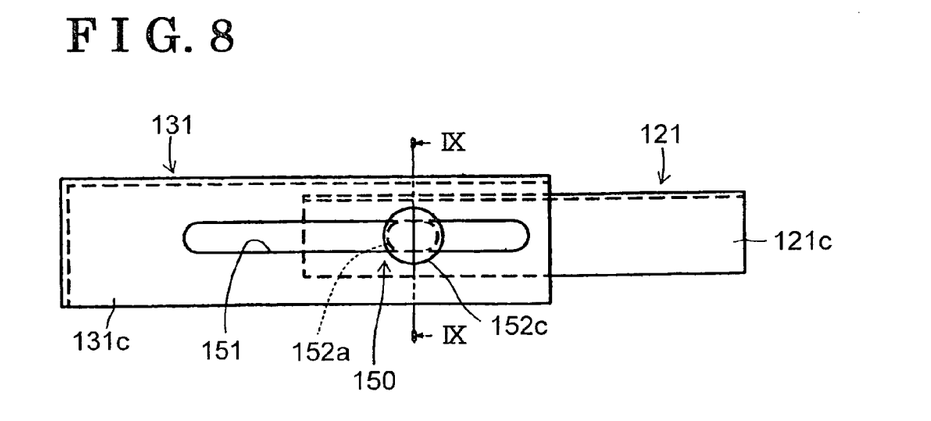
FIG. 8 is a partially enlarged front view showing the electric telescopic apparatus for the vehicle seat of FIG. 6 according to the second embodiment of the present invention.
Figure 9:
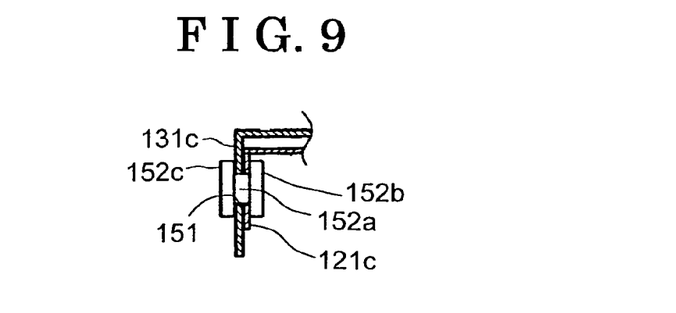
FIG. 9 is a cross-sectional view taken along line IX-IX in FIG. 8 according to the second embodiment of the present invention.

The second guide portion 151 is an elongated bore which is provided at the side plates 131b, 131c and extends in the moving direction. The second engagement portion 152 includes an engagement portion 152a and flanges 152b, 152c which are provided at respective ends of the engagement portion 152a. The engagement portion 152a is formed approximately in ellipse shape in cross-section, and also includes linear portions which contact linear sides of the second guide portions 151, 151 respectively. Accordingly, the movable body 131 can slide without wobbling in up or down. Although the engagement portions 152a are formed in approximately in ellipse shape having linear sides in cross-section according to the second embodiment of the present invention, two second engagement portions 152 each having an engagement portion which is formed in perfect circle in cross-section may be provided at both of the side plates 131b, 131c. With this construction, the movable body 131 can slide without wobbling up or down. According to the second embodiment of the present invention, the movable body 131 can be securely guided with a simple structure.

Although the window 32 (132) is provided at the top plate 31 (131) and the rack 33 (133) is attached in the periphery of the window 32 (132) according to the first and second embodiments, the rack 33 (133) may be provided on a bottom surface of the top plate 31 (131) via a thin spacer without providing the window 32 (132). In those circumstances, the first guide portion may be convexly disposed on a bottom surface of the top plate 31 (131) and extended in a moving direction. With this construction, because the movable portion can be made as a built-in construction, the base body 21 (121) and the movable body 31 (131) can be covered with more simple construction.

Figure 10:
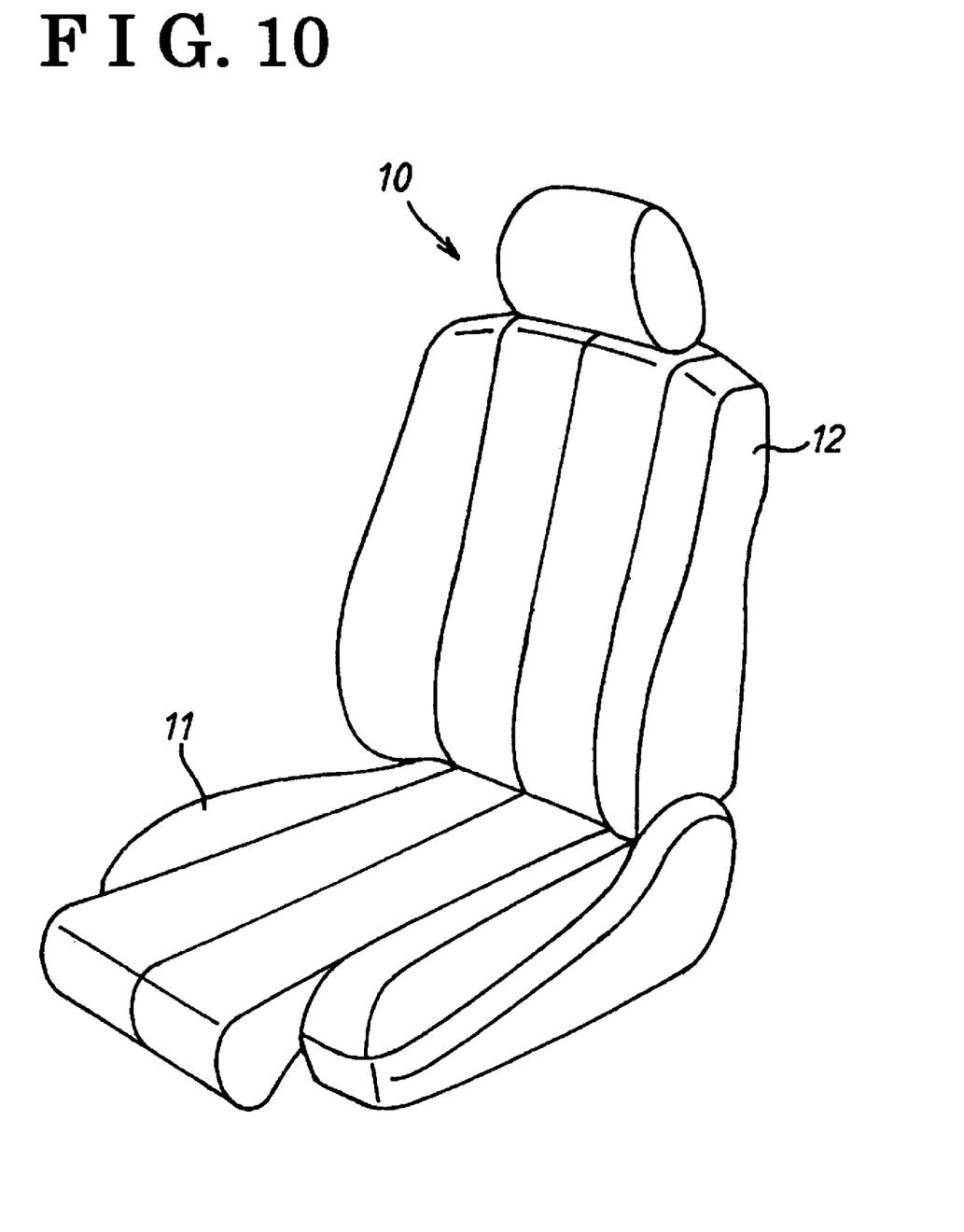
FIG. 10 is a perspective view showing an electric telescopic apparatus for a vehicle seat applied to a vehicle seat having a seat portion whose tip end portion extends and retracts according to an embodiment of the present invention.

Although the electric telescopic apparatus for the vehicle seat of the present invention is applied to a vehicle seat provided with an ottoman according to the first and second embodiments of the present invention, as shown in FIG. 10, the electric telescopic apparatus for the vehicle seat of the present invention may be applied to a vehicle seat in which a tip end portion of a seat portion shown in FIG. 10 extends and retracts. FIG. 10 shows a state of the vehicle seat at which the tip end portion of the seat portion is stretched.

According to the embodiment of the present invention, upon a rotation of the pinion driven by the drive source built in the base body (or the movable body), the rack having the teeth at the side portion thereof in the longitudinal direction and formed in a plate shape which is tightly in contact with and horizontally secured to the movable body (or the base body) slides to slide the movable body (or the base body). Accordingly, although a level of height for accommodating the rack is required, because a level of height required for accommodating support structures which support the first and second spindle drives and the first and second spindle nuts is not necessary, thickness of the electric telescopic apparatus can be remained thin with a simple construction. Because the rack is fixed horizontally in a tight contact manner on either the top surface or the bottom surface of the movable body (or the base body), high degree of strength capabilities can be achieved with a simple structure. Further, the guide mechanism securely guides the movable body and the base body in the moving direction of the movable portion.

According to the embodiments of the present invention, the speed reducer which reduces the rotation speed of the drive source is a large diameter gear which is coaxially to and integrally assembled to the pinion and whose external gear is engaged with a gear provided at the output shaft of the drive source. Thus, because the large diameter gear is provided on either the top surface or the bottom surface of the movable body (or the base body) horizontally, a height of the speed reducer can be reduced, and the thickness of the apparatus can be thinner.

According to the embodiment of the present invention, because the rack is provided approximately in the center of the movable body or the base body in the width direction, wobble movement (moment) in the width direction at the sliding is reduced compared to the case when the rack is provided at the side portions. Accordingly, the guide mechanism can be constructed with a simple structure, and the structure of the apparatus per se can be simplified.

According to the embodiment of the present invention, the first guide portion which is formed on the top surface or the bottom surface of either one of the base body and the movable body in the vicinity of the rack in parallel to and facing the rack, and the first engagement portion provided on the top surface or the bottom surface of the other of the base body or the movable body and engaged with the first guide portion are further provided. Accordingly, when the movable body starts sliding, wobble movement in the width direction can be restrained by the engagement between the first guide portion and the first engagement portion, and the movable body can star sliding smoothly.

According to the embodiment of the present invention, the guide mechanism further includes the second guide portions which are provided the sides on the right and left respectively of either one of the base body or the movable body to be extended in the moving direction of the movable portion and the second engagement portions which are provided at side on the right and left of the other of the base body or the movable body to be guided by engaging the second guide portion. Accordingly, the guide mechanism can guide the movable body or the base body securely with a simple structure.

According to the embodiment of the present invention, the guide mechanism includes the shafts which are provided at sides on the right and left respectively in either one of the base body or the movable body and extend in the moving direction of the movable portion, and the guides which are provided at the sides on the right and left of the other of the base body and the movable body and outfitted onto the shaft to be slidable thereon. Thus, it is not necessary to provide the guide mechanism on the external periphery of the apparatus. Accordingly, the construction of the cover member which covers the base body and the movable body can be simplified.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric telescopic apparatus for a vehicle seat, comprising:
    a base body provided at one of a seat portion of the vehicle seat and a base portion of an ottoman;
    a movable body provided at a movable portion, the movable body assembled to the base body so as to extend or retract forward and backward relative to the base body;
    a rack fixed horizontally in a tight contact manner on one of a top wall and a bottom wall of one of the base body and the movable body, the rack being formed in a plate shape which extends in the extending and retracting direction of the movable body, and having teeth at a longitudinal side portion thereof;
    a pinion housed in the other of the base body and the movable body and configured to be engaged with the rack;
    a drive unit having a drive source for driving the pinion;
    a guide mechanism provided at the base body and the movable body to guide the movable body in the extending and retracting direction of the movable body; and
    an anti-wobble mechanism including a first guide portion and a first engagement portion, the first guide portion being formed as an inner peripheral surface of an aperture formed in one of the top wall and the bottom wall of one of the base body and the movable body, the first guide portion being a straight-line surface opposing the rack and parallel to the rack, the first engagement portion being formed on at least one of the top wall and the bottom wall of the other of the base body and the movable body, and the first engagement portion slidably engaging the first guide portion;
    wherein guide mechanism includes a shaft provided at side surfaces on the right and left of one of the base body and the movable body and extended in the extending and retracting direction of the movable body; and a guide provided at side surfaces on the right and left of the other of the base body and the movable body and outfitted onto the shaft to be slidable.

2. The electric telescopic apparatus for the vehicle seat according to claim 1, wherein the drive unit includes a speed reducer which reduces a driving speed of the drive source; the speed reducer is a gear which is assembled coaxially and integrally with the pinion and has external teeth which engage with a gear attached on an output shaft of the drive source, the speed reducer having a diameter greater than a diameter of the pinion.

3. The electric telescopic apparatus for the vehicle seat according to claim 1, wherein the rack is provided at the center of one of the base body and the movable body in a width direction.

4. The electric telescopic apparatus for the vehicle seat according to claim 1, wherein the first engagement portion includes a pair of spaced pins which each engage the inner peripheral surface of the aperture.

5. The electric telescopic apparatus for the vehicle seat according to claim 1, wherein the aperture is a through-aperture passing through the one of the top wall and the bottom wall.

6. An electric telescopic apparatus of a vehicle seat, comprising:
- a base body provided at the vehicle seat;
- a movable body assembled to the base body so as to move forward and backward relative to the base body;
- a rack having teeth, the rack fixed on one of a top wall and a bottom wall of one of the base body and the movable body;
- a pinion mounted on the other of the base body and the movable body and engaging the rack;
- a motor connected to the pinion to rotate the pinion; and
- an anti-wobble mechanism including a first engagement portion and an inner peripheral surface of an aperture formed in one of the top wall and the bottom wall of one of the base body and the movable body, the first engagement portion being provided on the other of the base body and the movable body, and the first engagement portion slidably engaging the inner surface of the aperture;
- wherein the aperture is a through-aperture passing through the one of the top wall and the bottom wall.

7. The electric telescopic apparatus of the vehicle seat according to claim 6, wherein the inner peripheral surface of the aperture engaged by the first engagement portion is positioned in opposition to the teeth of the rack so that the pinion and the first engagement portion are located between the rack and the inner peripheral surface of the aperture engaged by the first engagement portion.

8. The electric telescopic apparatus of the vehicle seat according to claim 6, wherein the first engagement portion comprises at least one pin passing through the through-aperture.

9. The electric telescopic apparatus of the vehicle seat according to claim 8, wherein the pinion passes through the through-aperture.

10. The electric telescopic apparatus of the vehicle seat according to claim 6, wherein the pinion passes through the through-aperture.

11. The electric telescopic apparatus of the vehicle seat according to claim 6, further comprising a guide mechanism provided at the base body and the movable body to guide the movable body forward and backward relative to the base body.

12. An electric telescopic apparatus for a vehicle seat, comprising:
- a base body provided at one of a seat portion of the vehicle seat and a base portion of an ottoman;
- a movable body provided at a movable portion, the movable body assembled to the base body so as to extend or retract forward and backward relative to the base body;
- a rack fixed horizontally in a tight contact manner on one of a top wall and a bottom wall of one of the base body and the movable body, the rack being formed in a plate shape which extends in the extending and retracting direction of the movable body, and having teeth at a longitudinal side portion thereof;
- a pinion housed in the other of the base body and the movable body and configured to be engaged with the rack;
- a drive unit having a drive source for driving the pinion;
- a guide mechanism provided at the base body and the movable body to guide the movable body in the extending and retracting direction of the movable body; and
- an anti-wobble mechanism including a first guide portion and a first engagement portion, the first guide portion being formed as an inner peripheral surface of an aperture formed in one of the top wall and the bottom wall of one of the base body and the movable body, the first guide portion being a straight-line surface opposing the rack and parallel to the rack, the first engagement portion being formed on at least one of the top wall and the bottom wall of the other of the base body and the movable body, and the first engagement portion slidably engaging the first guide portion;
- wherein the first engagement portion includes a pair of spaced pins which each engage the inner peripheral surface of the aperture.

13. The electric telescopic apparatus for the vehicle seat according to claim 12, wherein the drive unit includes a speed reducer which reduces a driving speed of the drive source; the speed reducer is a gear which is assembled coaxially and integrally with the pinion and has external teeth which engage with a gear attached on an output shaft of the drive source, the speed reducer having a diameter greater than a diameter of the pinion.

14. The electric telescopic apparatus for the vehicle seat according to claim 12, wherein the rack is provided at the center of one of the base body and the movable body in a width direction.

15. The electric telescopic apparatus for the vehicle seat according to claim 12, wherein the guide mechanism includes a guide portion provided at side surfaces on the right and left of one of the base body and the movable body and extended in the extending and retracting direction of the movable body; an engagement portion provided at side surfaces on the right and left of the other of the base body and the movable body and engaged with the guide portion.

16. The electric telescopic apparatus for the vehicle seat according to claim 12, wherein the aperture is a through-aperture passing through the one of the top wall and the bottom wall.

* * * * *